TEXTURED SURFACE PAINTING SHEETS AND METHOD OF MAKING SAME

Original Filed Dec. 30, 1964

INVENTOR

MAX KLEIN

BY Allen Sloman & Pantos

ATTORNEYS

United States Patent Office

Re. 26,948
Reissued Sept. 8, 1970

26,948

TEXTURED SURFACE PAINTING SHEETS AND METHOD OF MAKING SAME

Max Klein, Smithfield, Mich., assignor, by mesne assignments, to KMS Industries, Inc., Ann Arbor, Mich., a corporation of Delaware Original No. 3,287,193, dated Nov. 22, 1966, Ser. No. 422,233, Dec. 30, 1964. Application for reissue Nov. 20, 1968, Ser. No. 786,495
Int. Cl. B44c *3/08;* B44f *7/00;* G09b *11/10*
U.S. Cl. 161—18 8 Claims

Matter enclosed in heavy brackets [ ] appears in the original patent but forms no part of this reissue specification; matter printed in italics indicates the additions made by reissue.

*ABSTRACT OF THE DISCLOSURE*

*The textured surface painting sheets have on one surface a line outline of areas to be painted which have indicia therein indicating the color of paint to be applied, said sheet being made of a material having said surface capable of taking and retaining ia molded shape, and said sheet having said surface permanently set into the texture of said original oil painting. A layman painter who applies a smooth coat of paints of the indicated colors to said sheet is enabled to faithfully reproduce the color and texture of the orignal oil painting.*

*The method of making the textured surface painting sheets comprises preparing a sheet having a painting surface capable of being molded and taking on a permanent set. The painting surface is also provided with a visible line outline of the identified areas to be painted with indicated colors so as to reproduce, when so painted, the colors of the original painting. A die is prepared which has on one surface the image or reverse image of the surface texture of the original oil painting. This may be done by conventional methods of tracing the surface on steel die blanks or by means of a casting from the original painting using a suitable material such as plastic, metal, plaster of Paris and then duplicating this cast surface upon metal dies. The painting surface is then molded in the die to impart to it the surface texture corresponding to the original painting and given a permanent set.*

*The painting sheet may be provided with a marginal area simulating a frame.*

This application is a continuation-in-part of my copending application, Serial No. 383,081, filed July 16, 1964 entitled, "Textured Surface Painting and Method of Making Same," [which disclosed as follows:] *which has been abandoned in favor of this application.*

This invention relates to a textured surface painting and method of making same.

Various so-called "painting-by-the-numbers" kits have been available to unskilled artists, wherein by following instructions and picture outlines imprinted upon a sheet of canvas or cardboard or paper, such persons are able to produce a painted picture which simulates an original painting. However, the average unskilled person using such a kit, does not have sufficient skill in applying paint, brushing, etc., to make the picture look more professional and realistic. Particularly, he is unable to form the textured type of surface which normally is formed on an original oil painting wherein the skilled artist by the use of thick brush strokes and pallet knife application of paints is able to produce a thickly and heavily textured surface to produce various desired artistic effects.

Thus, it is an object of this invention to provide a painting surface and a method by which an unskilled person may duplicate an oil painting including duplicating predetermined textured surface effects such as brushmarks, pallet knife marks, paint build-up and three dimensional thicknesses, etc.

A further object of this invention is to provide a numbered or coded painting surface which is pre-formed and pre-molded into desired textured shapes so that upon the application of only a smooth coating of paint, the surface takes on the appearance of a heavily treated, thickly coated, pallet knife applied surface.

These and other objects and advantages of this invention will become apparent upon reading the following description, of which the attached drawing forms a part.

Figure 3:
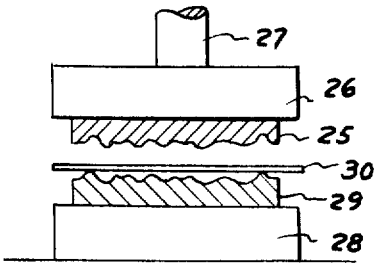

FIG. 3 schematically illustrates the molding of a sheet into a predetermined textured surface.

Figure 4:
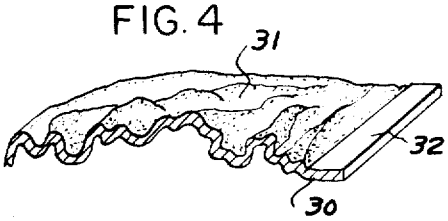

FIG. 4 illustrates, in perspective, a fragment of the molded sheet.

Figure 1:
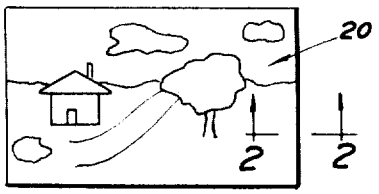
FIG. 1 is a front view of a painting representing an original artistic oil painting made by a professional artist and having a heavily textured surface.
Figure 5:
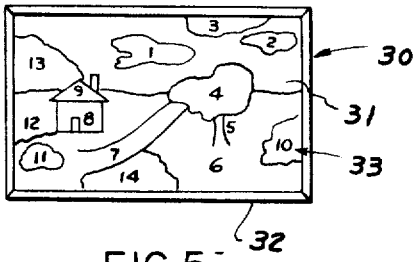

FIG. 5 is a front view of the molded sheet upon which indicia has been imprinted and simulates, in outline form, the original oil painting of FIG. 1.

Figure 6:
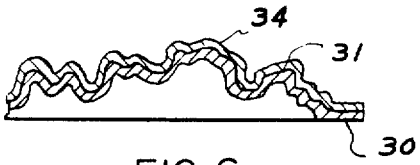

FIG. 6 is a cross-sectional, fragmentary view of a portion of the sheet with the plastic coating applied.

Figure 7:
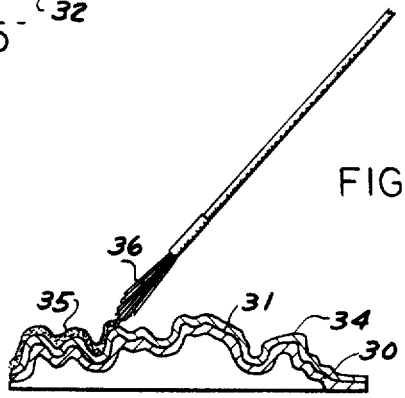

FIG. 7 is a view similar to FIG. 6, but showing the application of paint to the textured surface.

FIG. 1 schematically illustrates an oil painting 20 made by a professional artist. This would be an original, artistic oil painting having a heavily applied paint finish with brush marks, pallet knife marks, and the hills and valleys normally associated with the pallet knife technique of applying paint. Thus, the invention here is concerned with duplicating the original oil painting and in enabling an unskilled person to easily duplicate such painting by following instructions and using only a smooth coat of paint upon the surface of a preformed sheet of canvas, cardboard, Fiberglas, paper, plastic or the like.

Figure 2:
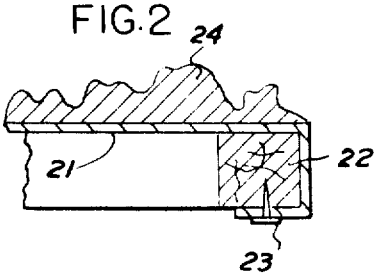
FIG. 2 is an enlarged fragmentary section taken in the direction of arrows 2—2 of the painting of FIG. 1.

As shown in FIG. 2, the painting 20 is made upon a sheet of canvas 21, masonite or any other surface which in turn is fastened to the conventional wood frame 22 by the means of tacks 23. The thickly applied coat of paint 24 presents a heavily textured, brushmarked or pallet knife type surface with hills and valleys.

After the painting has been completed, complimental molds or matching die-halves 25, 29 are formed from the painting. The mold cavities are a reverse image of the surface of the original painting. Such molds may be made by the conventional methods of tracing the surface upon steel die blanks or by means of casting, either in plastic, metal or plaster of Paris, the surface, and then duplicating this cast surface upon metal dies. The painting surface may be a plastic or plastic-like material, vacuum formed in a die to reproduce the texture of the original painting.

Once the dies 25, 29 have been completed they are secured respectively to the upper movable plate 26 of a press having a power ram 27 (schematically illustrated in FIG. 3), and to the lower bed 28 of the press.

Placed upon lower die 29 is a sheet 30, formed of a stiff paper or cardboard or stiffened canvas, cloth or Fiberglas or plastic-like material.

When the press is closed, the dies come together with the sheet 30 therebetween to mold it into a textured surface which duplicates the original textured surface of the original oil painting of FIG. 1. FIG. 4 illustrates the textured surface 31 formed in the sheet 30 and also shows a margin 32 formed around the textured area.

Preceeding the molding step, the sheet surface is imprinted in the conventional manner, with a line outline of the portions of the original painting and with various color areas outlined with numbers or other indicia 33 imprinted in each of the various outlined areas to indicate the color of paint to be applied. Such indicia thus serves to guide the amateur painter to colors and areas of paint application.

Before the molding process a resin 34 may be used to saturate a cloth or simulated cloth or plastic-like material. Such resin will be cured by heat and pressure during the molding process and then take on a permanent set of the contours of the die or dies.

The resin coating 34 may be any one of many suitable plastics available on the market such as urea type, polyester type, phenolic type, or any liquid or powder plastic material. Such coating may be applied by a roller coating, spray process or by a dip or painting process or by merely placing the resin on the material just before molding.

Thus, the resin is spread out to cover the sheet, thereby stiffening the sheet and preventing it from springing out of its molded shape.

After molding and curing, the sheet is ready for painting and may be sold in a kit containing tubes of oil paint of small containers or dried chips of water color or oil paint. The purchaser with brush 36, FIG. 7, merely applies a coating 35 of the paint upon the surface of the sheet, following the instructions. The end result will be a painting having a textured surface which simulates the original professional painting, this being accomplished in a short amount of time and with practically no skill.

Once the painting is completed and dried, it may be framed, using the margins 32, within any suitable, conventional frame and it may be mounted upon the wall in the same manner as a conventional picture.

ADDITION OVER CO-PENDING APPLICATION

Hereinabove, sheet 30, with color coded numbered areas 1 through 13, is molded into the textured surface 31 shown duplicating the textured surface of the original oil painting 20, FIG. 1.

FIGS. 4 and 5 also show a three-dimensional margin 32 formed around the margin of the textured area. Such molded margin may itself be a mitered frame. This eliminates the separate step of framing the completed picture.

Thus, the frame shown at 32, FIGS. 4 and 5, is provided in the forming process, FIG. 3, as an integral part of the molded textured sheet.

This invention may be further developed within the scope of the following claims. Accordingly, it is desired that the foregoing description be read as being merely illustrative of an operative embodiment of this invention and not in a strictly limited sense.

I now claim:

1. In a method of reproducing, as to texture and color, a conventional oil painting on canvas having brushmarks and pallet knife type textured hills and valleys upon the surface of the painting; the steps of, first, imprinting a final sheet with the boundaries of the zones to be colored, thus reproducing thereon the color zones of the painting, and printing numbers on such zones;

second, forming a die from the surface contour of the painting, with the die surface duplicating the texture of the painted surface;

third, pressing the die to the imprinted final sheet to mold the contour of the painting onto the imprinted final sheet; and fourth, spreading paint upon the contoured surface of the imprinted and molded final sheet to thereby duplicate thereon the painting, including its colors and surface texture.

2. In the method of claim 1 forming the die with a marginal smooth area which will define a marginal smooth area on the imprinted final sheet, simulating a frame portion thereof surrounding the textured portion thereof.

*3. The process of producing a painting-by-the-numbers sheet which, following application by a painter of a smooth coat of paint corresponding to the numbers, reproduces both the color and surface texture of an original oil painting having hills and valleys normally associated with brush marks and/or pallet knife technique of applying oil paint comprising the steps of:*

*(a) preparing a sheet having a painting surface capable of taking and retaining a molded shape having visible on said surface a line outline of the identified areas to be painted with various colors of paint to reproduce the colors of the original painting,*

*(b) preparing a die having an image of the surface of the original painting on one face thereof,*

*(c) molding into said painting surface of said sheet against said face of said die the textured surface of the original oil painting, and*

*(d) causing said sheet while it is against the face of the die to take a permanent set of the contours of said die.*

*4. A method of making a painting-by-the-numbers sheet which facilitates the reproduction by an amateur painter of an original oil painting which comprises imprinting on the surface of a sheet to be painted boundary lines of the areas to be colored and indicia indicating the respective colors to be applied to said areas, said surface of said imprinted sheet to be painted being a heat curable substance capable of taking on a permanent set, molding said surface on a die having a surface configuration which is a reverse image of the configuration of the painted surface of the original oil painting to mold said sheet into a textured surface which duplicates the textured surface of said oil painting, and subjecting said sheet during such molding to the action of sufficient heat for curing the substance to take on a permanent set of the contours of said die.*

*5. A process of producing a painting-by-the-numbers sheet having visible on one surface a line outline of identified areas to be painted with a smooth coating of various colors of paint to reproduce the colors of an original oil painting, said surface being permanently set into the texture of said original oil painting comprises the steps of:*

*(a) preparing a sheet having a surface capable of taking on and retaining a permanent set, and*

*(b) producing:*

*(i) said permanent set of the texture of said original oil painting into said surface, and*

*(ii) said line outline of identified areas to be painted to reproduce the colors of said original oil painting.*

*6. A process of producing a painting-by-the-numbers sheet for enabling an amateur painter to produce a copy of an original oil painting in which both the colors and the textured surface thereof, including hills and valleys normally associated with brush marks and/or pallet knife technique of applying oil paint, are faithfully reproduced*

*on the painting surface thereof, comprising preparing a sheet of material such that said painting surface is capable of taking on a permanent set, producing boundary lines visible on said painting surface of the areas to be colored and indicia indicating the respective colors to be applied to said areas, and molding said painting surface so that it has a permanently set contour which faithfully reproduces the said textured surface.*

*7. A painting-by-the-numbers sheet produced by the process of claim 5.*

*8. A painting-by-the-numbers sheet produced by the process of claim 6.*

References Cited

The following references, cited by the Examiner, are of record in the patented file of this patent or the original patent.

UNITED STATES PATENTS

| | | | |
|---|---|---|---|
| 3,057,097 | 10/1962 | Douglas | 161—18 |
| 2,184,121 | 12/1939 | Henriksen | 161—18 |
| 2,744,349 | 5/1956 | Grossman | 35—26 |

FOREIGN PATENTS

| | | |
|---|---|---|
| 116,633 | 6/1918 | Great Britain. |

JACOB H. STEINBERG, Primary Examiner

U.S. Cl. X.R.

35—26; 101—32; 156—59; 161—138, 413